W. McCORMICK.
FRUIT-LIFTER.

No. 177,863. Patented May 23, 1876.

WITNESSES:

INVENTOR:
Wm. McCormick
BY
ATTORNEYS.

UNITED STATES PATENT OFFICE.

WILLIAM McCORMICK, OF BLAIR, NEBRASKA.

IMPROVEMENT IN FRUIT-LIFTERS.

Specification forming part of Letters Patent No. 177,863, dated May 23, 1876; application filed July 31, 1875.

*To all whom it may concern:*

Figure 1:
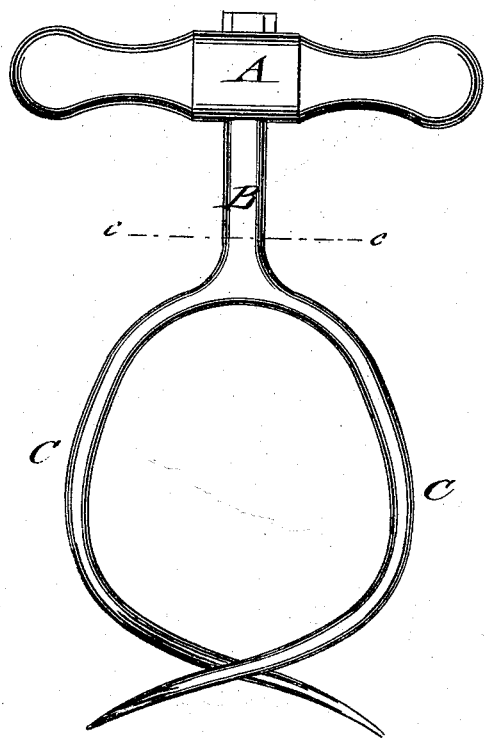
Figure 2:
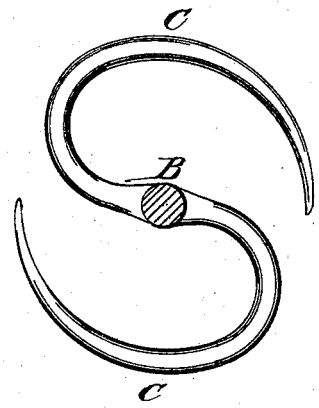

Be it known that I, WILLIAM McCORMICK, of Blair, in the county of Washington and State of Nebraska, have invented a new and Improved Fruit-Auger, of which the following is a specification:

In the accompanying drawing, Figure 1 represents a side view, and Fig. 2 a top view, partly in section, on line $c\ c$, Fig. 1, of my improved fruit-auger.

Similar letters of reference indicate corresponding parts.

Numerous devices have heretofore been constructed for the purpose of loosening packed dried fruits; but all are more or less defective in practice, the difficulty generally being that when the implement is screwed into the mass the fruit becomes clogged or packed between the prongs, and has to be removed therefrom by hand, thereby rendering the operation very defective, besides causing much loss of time, and annoyance.

My invention is specially designed to remedy these difficulties, the object being to produce an implement that will readily enter or penetrate the packed mass, and from which, when the fruit has been loosened up, it will readily free itself.

The implement consists of a shank, B, provided with a handle, A, as shown in Fig. 1. From the lower end of the shank B there project two curved tines or prongs, C. These prongs, instead of being twisted like a corkscrew, as is usually the case in this class of implements, are spread apart, and project in a nearly vertical plane for half their length or more, and then have their lower ends bent or inclined, so as to make about a half turn horizontally, as represented in Fig. 1. It will be seen that the prongs recede from each other from the shank downward, thus constantly increasing the space between them until the point is reached at which the horizontal turn or twist begins or becomes decided, and that they are then given about half a turn each, leaving their points inclined outward and downward at opposite sides, as shown in Fig. 1, the spiral curvature or twist being almost wholly in the lower portion of the prongs, and being far less than is usual in these implements as heretofore constructed, the two prongs, when viewed from their lower ends, having a curvature very similar to the letter S. The prongs are made long and slender, and have their ends made pointed, so as to easily and readily enter the packed mass of fruit.

This implement thus made is found in practice to operate most satisfactorily. To loosen the fruit the prongs are pressed or thrust into the mass, the implement being turned slightly as it is pressed down, and when it has entered sufficiently if it is drawn up, bringing the fruit with it, the latter being easily detached therefrom on account of the peculiar shape of the prongs.

I am aware that fruit-augers have been made with a single prong, and also with two prongs, twisted like a cork-screw, as shown in the patent to Schmeltzer and Roberts, October 28, 1873, and I do not claim such; but What I do claim is—

The herein-described fruit-auger, having its prongs C nearly straight for about half their length, and then twisted or curved sidewise about one-half turn, substantially as shown and described.

WILLIAM McCORMICK.

Witnesses:
L. W. OSBORN,
THOS. R. ASHLEY.